United States Patent
Oku et al.

(10) Patent No.: US 6,702,912 B1
(45) Date of Patent: Mar. 9, 2004

(54) PRODUCTION SYSTEM FOR PNEUMATIC TIRES

(75) Inventors: Masaharu Oku, Kodaira (JP); Keishi Mineo, Ohme (JP); Shigeru Kaneko, Higashimurayama (JP); Sigeru Miyazaki, Akiruno (JP); Taizo Ito, Kodaira (JP); Akio Obayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/207,411

(22) Filed: Dec. 8, 1998

(30) Foreign Application Priority Data

Dec. 8, 1997  (JP) ............................................. 9-336923
Sep. 2, 1998  (JP) ........................................... 10-248628

(51) Int. Cl.[7] .............................................. B29D 30/00
(52) U.S. Cl. .................... 156/110.1; 156/111; 425/34.1; 425/47; 264/326
(58) Field of Search ............................. 156/111, 110.1, 156/396, 123, 130.5; 425/34.1, 28.1, 47; 264/326

(56) References Cited

U.S. PATENT DOCUMENTS

| | | | | |
|---|---|---|---|---|
| 4,728,274 A | * | 3/1988 | Siegenthaler | 425/34.1 |
| 4,773,810 A | | 9/1988 | Nishimura et al. | |
| 4,877,468 A | * | 10/1989 | Siegenthaler | 156/111 |
| 5,622,669 A | * | 4/1997 | Dailliez et al. | 264/403 |
| 5,820,885 A | * | 10/1998 | Irie | 425/34.1 |

FOREIGN PATENT DOCUMENTS

EP  0 170 109 A  2/1986
EP  0 875 364 A2  11/1998

OTHER PUBLICATIONS

Fumero et al., "Capacity Management through Langrangean Relaxation: an Application to Tyres Production," Production Planning and Control, vol. 7, No. 6, 604–614, Dec. 1996.*
Park et al., "Heuristic Knowledge Representation of Prduction Scheduling: An Integrated Modeling Approach," Expert Systems With Applications, vol. 10, No. 3/4, pp. 325–339, 1996.*
Lingaraj et al., excerpt from "Optimal Design of a Tire Plant," Opsearch, vol. 13, Nos. 3/4, pp. 182–196, 1976.*
Im, J. H., "Lesson from Japanese Production Management," Production and Inventory Management Journal, Third Quarter 1989, pp. 25–30.*
Weiss, E. N., "Lot Sizing is Dead: Long Live Lot Sizing," Production and Inventory Management Journal, First Quarter 1990, pp. 76–79.*

* cited by examiner

Primary Examiner—Geoffrey L. Knable
(74) Attorney, Agent, or Firm—Oliff & Berridge, PLC

(57) ABSTRACT

A pneumatic tire production system comprises production lines each including a green tire building station for assembling unvulcanized members of pneumatic tires into green tires. The green tires are vulcanized at a vulcanizing station which includes at least one vulcanizing unit equipped with a plurality of vulcanizing molds. The number of the vulcanizing mold is determined so as to satisfy the vulcanizing capacity which is substantially equivalent to the number of green tires formed at the building station within a predetermined unit time. The system serves to minimize the intermediate stock amount of green tires due to minimized changeover between different types of tires to be alternately produced.

5 Claims, 6 Drawing Sheets

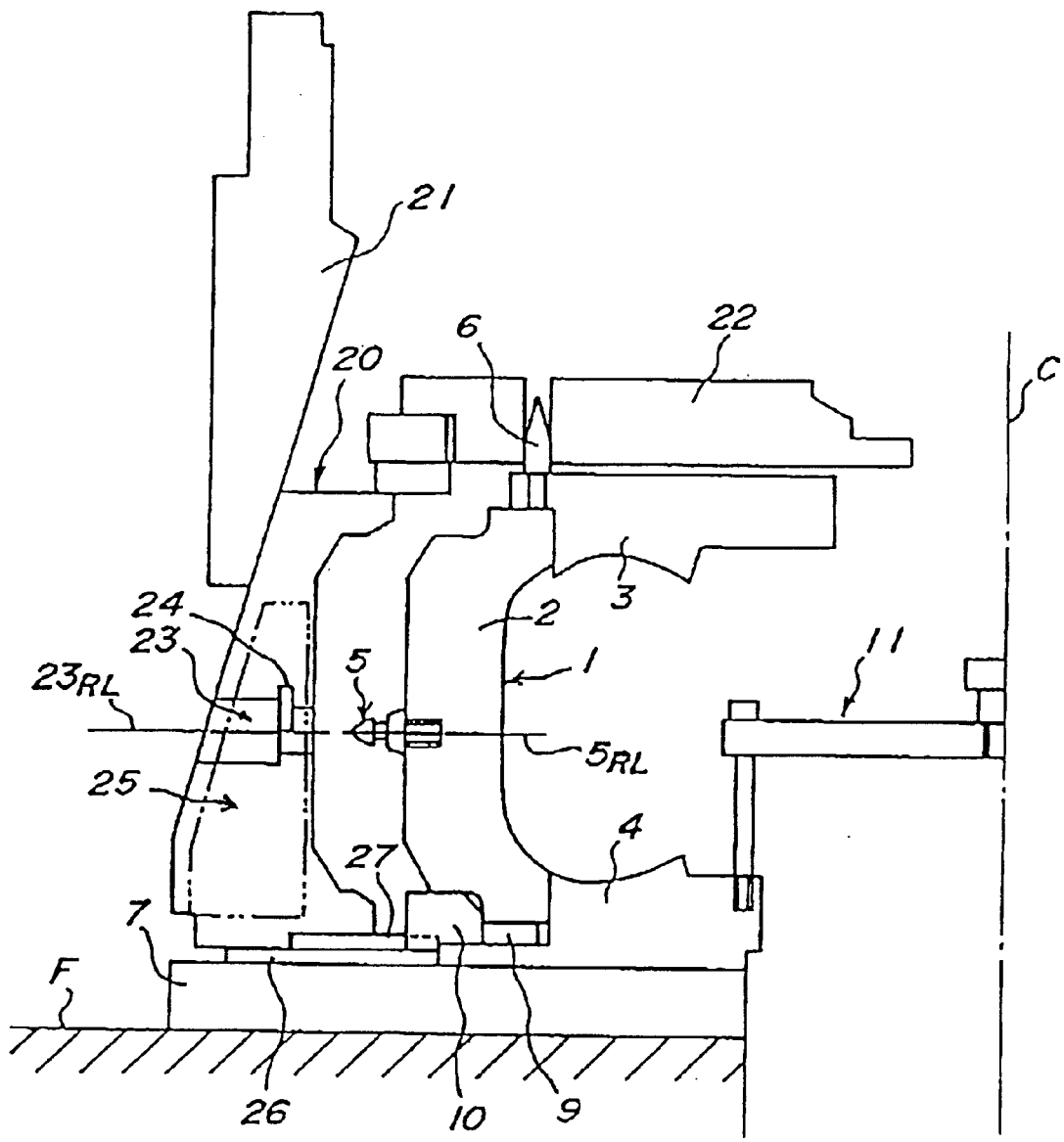
FIG_5

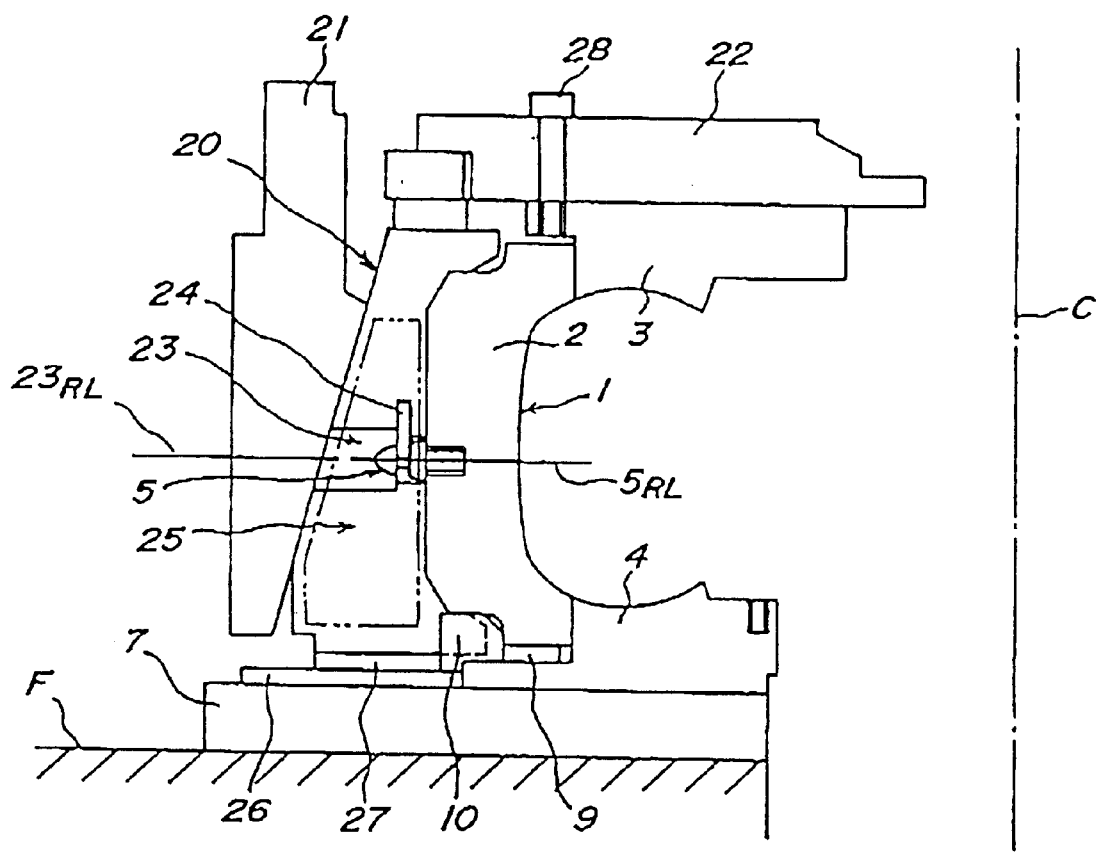
FIG_6

PRODUCTION SYSTEM FOR PNEUMATIC TIRES

BACKGROUND OF THE INVENTION

The present invention relates to a production system for pneumatic tires; more particularly, the present invention relates to a production system which substantially eliminates requirement for an intermediate stock of green to realize a significantly improved productivity at the green tires building station and also at the vulcanization station.

DESCRIPTION OF THE RELATED ART

The productivity required for manufacturing pneumatic tires, in particular pneumatic radial tires, is affected by the capacity of the building process whereby unvulcanized component member of tires are assembled with each other into green tires. Therefore, various proposals have been made which successfully resulted in considerable reduction of the green tire building cycle time and improved building capacity. In view of the improvement achieved with respect to the green tire building process, particular attention has been focused on measures for improving the vulcanizing capacity and thorough research and development have been conducted aiming at an advanced vulcanization process which is performed at a higher temperature to shorten the vulcanization time while maintaining the quality of the tires, besides the improvement of the vulcanizing unit and the vulcanizing mold themselves. As a result, the vulcanization cycle time per one tire has been remarkably shortened than before.

The above-mentioned measures for improving the productivity have been applied mainly to the production of radial ply tires for passenger-cars ("PSR tires") and radial ply tires for trucks and buses ("TBR tires") which are accustomed to mass production, though the resultant technology are also applied to other kinds of tires.

In connection with tires of relatively small and intermediate sizes, such as PSR and TBR tires, there is a significant difference between the building cycle time per one green tire and the vulcanization cycle time per one green tire. Typically, the vulcanization cycle time is at least five times longer than the building cycle time.

Under the circumstances, it has been considered inevitable either to accept long stock time and increased stock amount of the green tires, or to perform changeover of the types of tires to be formed at the building station with a higher frequency so as to reduce the average building cycle time including the time required for the changeover.

A frequent changeover in types of green tires to be formed at the building station, however, is quite disadvantageous in that the productivity is remarkably lowered in the entire factory, so that the changeover at the building station has to be minimized. More particularly, a frequent changeover in types of green tires causes unacceptable increase in the kinds of intermediate materials, thereby giving rise to changeover loss, transfer loss and managing loss of the intermediate materials. The result is that not only the productivity is lowered but also a large factory space is required for the temporary storage of the intermediate materials. Moreover, an increased number of conveyors is required for the intermediate materials and the conveying system becomes thereby complicated, making it difficult to advance the automation of the tire production.

On the other hand, it has been considered appropriate that green tires are subjected to vulcanization by as few vulcanizing molds as possible. This is because a segmented mold is typically required for the production of PSR or TBR tires which is relatively complicated in structure and thus costly as compared to conventional two-piece type molds. As known in the art, a segmented mold generally includes a mold main body comprising a number of tread mold pieces forming the outer contour of the tread portion of the tire, and upper and lower side molds forming the side wall portions of the tire, as well as a container comprising segments which are arranged at the periphery of the tread mold pieces so as to be radially movable with respect to the center axis of the mold, a container ring, and a top plate. The structure of the segmented mold becomes further complicated in the case of PSR tires with an elaborated tread pattern, which makes the mold more expensive and requires a considerable amount of man-hours to exchange the mold main body.

Due to these grounds, it has been considered inevitable that the stock amount of green tires waiting for vulcanization is increased and additional storage facilities and associated devices for intermediate stocks of tire component members and green tires are required in a tire factory, including storage spaces, carriage or conveyors, or even warehouses for temporarily storing tire component members and/or green tires. Moreover, a particular attention has to be paid to avoid defects of green tires which may occur during the storage until vulcanization as the case may be.

DISCLOSURE OF THE INVENTION

It is highly desirable that a pneumatic tire production system is capable of significantly reducing the frequency of changeover at the green tire building station in respect of types of tires to be produced so as to improve the average building cycle time per one tire while maintaining the quality of green tires at a high level, and minimizing the loss time for the vulcanization process in order to improve the average vulcanization cycle time and thereby significantly improve the productivity of tires without essentially requiring intermediate stock of green tires.

It is therefore an object of the present invention to provide a pneumatic tire production system which satisfies these requirements.

According to one aspect of the present invention, there is provided a method for producing pneumatic tires, comprising a green tire building step for assembling unvulcanized members of a radial tire into a green tire, said green tire building step being performed in a building cycle time, and a vulcanization step for carrying out vulcanization of the green tire, said vulcanization step being performed in a vulcanizing cycle time which is longer than said building cycle time, wherein pneumatic tires are produced by at least one production line which comprises a green tire building station including at least one set of building drums, and a vulcanization station including at least one vulcanizing unit equipped with a plurality of vulcanizing molds of a number which satisfies a vulcanizing capacity substantially equivalent to the number of green tires formed at said building station within a predetermined unit time.

In this connection, the unit time may be determined as desired, for examples as 30 minutes or one hour. The number of green tires formed per unit time is not necessarily limited to a natural number, and it is in many cases a decimal. In order to prevent the green tire from becoming intermediate stock, according to the present invention, at least one vulcanizing unit is equipped with a plurality of vulcanizing molds of a number which satisfies the vulcanization capacity substantially equivalent to the number of green tires formed at said building station within a predetermined unit time.

According to one advantageous embodiment, the method of the present invention comprises the steps of: continuously producing pneumatic tires of a first type by synchronously building green tires at said building station and synchronously vulcanizing the green tires for the first type at the vulcanizing station; changing-over production of pneumatic tires from said first type to a second type which requires vulcanizing molds of a different type, by exchanging predetermined components of the tire building drums at said building station and synchronously exchanging predetermined vulcanizing molds at said vulcanizing station; and continuously producing pneumatic tires of a second type by synchronously building the green tires at said building station and synchronously vulcanizing the green tire for the second type at the vulcanizing station.

According to another advantageous embodiment, the method of the present invention comprises the steps of: alternately building green tires of a set of first and second types at said building station, and synchronously performing simultaneous vulcanization of the green tires of the set of first and second types at the vulcanizing station; changing-over production of pneumatic tires from the set of first and second types to a set of first and third types, by exchanging predetermined vulcanizing molds at the vulcanization station, the number of which corresponds to said building cycle time inclusive of a building-suspension time required for changing the vulcanizing molds into ones for the third type; and alternately building, synchronously with the exchange of the vulcanizing molds, green tires of the set of first and third types at the building station, and synchronously performing simultaneous vulcanization of the green tires of the set of first and third types at the vulcanizing station.

The word "synchronous" as used herein is to be distinguished from "simultaneousness"; rather, it means "immediately after completion of vulcanization" when there exists a green tire under vulcanization, or when a green tire unloaded to the mold is still waiting for vulcanization. It is in this respect that a predetermined number of molds, which satisfy the vulcanization capacity substantially equivalent to the number of green tires formed at the building station within a predetermined unit time, as described above, are preferably provided for a vulcanizing unit in a vulcanization station which is paired with the green tire building station.

Preferably, the production line for carrying out method of the present invention comprises exchanger means for exchanging said vulcanization molds, said exchanger means being associated with said vulcanizing unit, and an information processor for receiving information from said green tire building station indicating a changeover of the type of pneumatic tires to be produced, and providing an output information to said exchanger means indicating that the vulcanizing molds of the vulcanizing station are to be partly exchanged, whereby a partial exchange of the vulcanizing molds by the exchanger means is performed synchronously with the changeover of the type of pneumatic tires at the green tire building station.

The vulcanizing molds may be comprised of segmented molds each including a plurality of segmented tread mold pieces for forming an outer contour of a tire tread portion, a plurality of segments arranged on an outer peripheral side of the respective tread mold pieces, for radially moving the respective tread mold pieces, and means for automatically locking and releasing said segments to and from the respective tread mold pieces.

In this instance, each vulcanizing unit may include a container ring connected to the above-mentioned segments of the such that a vertical movement of the container ring causes a radial movement of the segments, an upper and a lower side molds which are engageable with the tread mold pieces, and a top plate for urging the upper side mold into engagement with the tread mold pieces, and wherein the vulcanizing molds at the vulcanizing unit are partially exchanged while the vulcanizing unit is out of operation, by (i) releasing said segments from the respective tread mold pieces and moving the container ring upward so that the segments are moved radially outwards, while the upper side mold in engagement with the tread mold pieces is separated from the top plate, and unloading the tread mold pieces and the upper and lower side molds connected therewith, and (ii) loading a plurality of segmented tread mold pieces and upper and lower side molds forming another segmented mold for a pneumatic tire of a different type, in their preliminarily connected and centered state, and moving the container ring downwards, so that said segments are moved inwards and locked with the segmented tread mold pieces while urging the top plate to the upper side mold.

According to another aspect of the present invention, there is provided a system for producing pneumatic tires including at least one production line which comprises: a green tire building station for assembling unvulcanized members of pneumatic tires into green tires, including at least one set of building drums; and a vulcanizing station for vulcanizing the green tires, including at least one vulcanizing unit equipped with a plurality of vulcanizing molds of a number which satisfies a vulcanizing capacity substantially equivalent to the number of green tires formed at said building station within a predetermined unit time.

According to an advantageous embodiment, the system of the present invention further comprises: mold storage means for storing the vulcanizing molds; a preheating chamber for preheating the vulcanizing molds immediately before they are mounted onto the vulcanizing unit; exchanger means for exchanging the vulcanizing molds by mounting or removing them onto or from the vulcanizing unit; and conveyor means for conveying the vulcanizing molds along a path which extends between the mold storage means and the exchanger means through the preheating chamber.

In this instance, the mold storage means may include a storage space in which the vulcanizing molds are stored in vertical arrays, and said preheating chamber is associated with the storage space.

According to another advantageous embodiment of the system, the above-mentioned at least one vulcanizing unit is movable along a path which extends between a first substation where vulcanized tires are unloaded from the vulcanizing molds and unvulcanized green tires are then loaded onto the vulcanizing molds, and a second substation where the vulcanizing molds after the unvulcanized tires have been loaded is supplied with a high temperature pressurized gas for vulcanization of the green tires.

The vulcanizing unit may be a stationary unit which is associated with loader means for unloading vulcanized tires from the vulcanizing molds and loading unvulcanized green tires onto the vulcanizing molds.

Preferably, the system of the present invention further comprises selector means for selecting the type of green tires, and conveyor means for conveying said selected green tires from the building drum at the green tire building station where two types of green tires are alternately built, to the relevant vulcanizing mold at the vulcanization station.

The vulcanizing molds may be segmented molds each including a plurality of segmented tread mold pieces for forming an outer contour of a tire tread portion, a plurality of segments arranged on an outer peripheral side of the respective tread mold pieces, for radially moving the respective tread mold pieces, and means for automatically locking and releasing said segments to and from the respective tread mold pieces.

In this instance, each vulcanizing unit may comprise a container ring connected to said segments such that a vertical movement of the container ring causes a radial movement of the segments, an upper and a lower side molds which are engageable with the tread mold pieces, and a top plate for urging the upper side mold into engagement with the tread mold pieces.

BRIEF DESCRIPTION OF THE DRAWINGS

The present invention will be further explained below with reference to some preferred embodiments shown in the accompanying drawings, in which:

FIG. 5 is a left-half sectional view of segmented molds in which the mold main body and a container are separated from each other, according to the invention;

FIG. 6 is a left-half sectional view of segmented molds in which the mold main body and the container are combined to each other, according to the invention.

It should be noted that while FIGS. 4 to 6 are sectional views, the illustration of hatching is omitted for the sake of simplicity.

DESCRIPTION OF THE PREFERRED EMBODIMENTS

The present invention provides an improved system for producing pneumatic tires, in particular radial ply tires, by performing a green tire building step for assembling unvulcanized members of a radial tire into a green tire GT within a predetermined building cycle time $T_A$, and a vulcanization step for carrying out vulcanization of the green tire within a predetermined vulcanizing cycle time $T_B$. The vulcanizing cycle time $T_B$ corresponds to the time as measured from loading of a green tire GT onto a vulcanizing mold until unloading or removal of a vulcanized tire after the vulcanization of the green tire has been completed. As generally known in the art, the vulcanizing cycle time $T_B$ is typically at least five times longer than the building cycle time $T_A$. This will be more fully explained below with reference to FIG. 1, in connection with the number of segmented molds for PSR tires by way of example.

Figure 1:
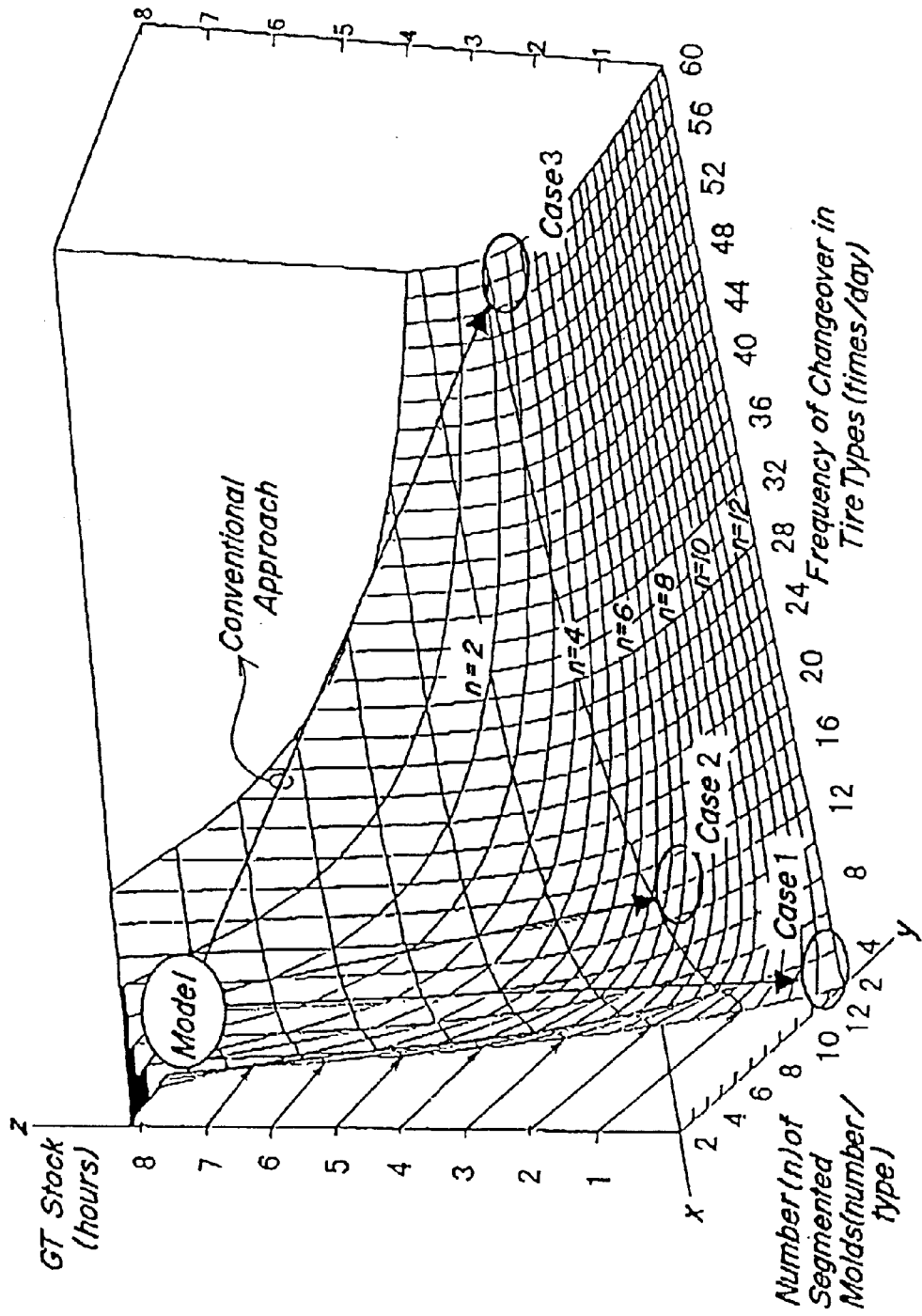
FIG. 1 is a three-dimensional map showing the relationship among the green tire stock time, the number of vulcanizing molds and the frequency of changeover between types of tires to be produced.

FIG. 1 shows an exemplary situation in which the ratio $T_B/T_A$ of the vulcanizing cycle time $T_B$ to the building cycle time $T_A$ with respect to one green tire GT for a PSR tire is approximately 12. In this instance, x-axis indicates the frequency of changeover between different types of tires to be produced during 24 hours, i.e., per one day, y-axis indicates the number (n) of the segmented molds, and z-axis indicates the stock time of green tires GT after tire component members have been assembled into the green tires GT.

It is assumed, by way of example, that the pneumatic tires are produced in full operation, i.e., 24 hours per one day.

The group of curves in FIG. 1 show the relationship between the GT stock time and the frequency of the changeover between types of tires to be produced during 24 hours, i.e., one day, with the number of the molds as a parameter which ranges from 2–12. When, for example, one green tire building station is equipped with two vulcanizing molds, the GT stock time amounts approximately to 7–8 hours with the changeover performed twice to 10 times per day between different types of PSR tires. Such a model situation is indicated in FIG. 1 by the circled region which is denoted by the legend "Model". Assuming that the same number and types of tires as "Model" case are to be produced, in order to reduce the GT stock time to be within approximately one hour with the same two vulcanizing molds, the frequency of the changeover between types of the tires to be produced has to be increased to as many as 60 times per day, as indicated by the circled region which is denoted by the legend "Case 3" in FIG. 1. Thus, it has been a conventionally accepted approach to perform production of tires by simply adopting the conditions of Case 3.

According to the present invention, pneumatic tires are produced by at least one production line which comprises a green tire building station including at least one set of building drums, and paired with a vulcanization station which includes at least one vulcanizing unit. Each vulcanizing unit is equipped with a plurality of vulcanizing molds of a number which satisfies the vulcanizing capacity substantially equivalent to the number of green tires formed at the building station within a predetermined unit time, say one hour. It is of course that the number of the production line is determined according to the desired production scale, i.e., the number of tires to be produced within a predetermined time.

The concept of the present invention will be described in further details with reference to FIG. 1. The present invention determines the number of the segmented vulcanizing molds to be mounted on a vulcanizing unit, in view of the operational capacity of the green tire building station which is paired with the vulcanizing unit. Thus, assuming that the ratio $T_B/T_A$ of the vulcanizing cycle time $T_B$ to the building cycle time $T_A$ with respect to one green tire GT for a PSR tire is approximately 12, as in the above-mentioned exemplary situation, the number of the segmented molds is determined to be 12, in accordance with the present invention. By further assuming that pneumatic tires which are same in number and types as the "Model" case are to be produced, it is possible to reduce the GT stock time to substantially zero hour by performing the changeover between tire types twice a day, as indicated by the circled region which is denoted by the legend "Case 1" in FIG. 1.

According to the present invention, the green tire building station is operated to successively build a predetermine number of green tires of type A as one lot, while synchronously operating a group of vulcanizing units each mounted with 12 molds for green tires of type A, so that the green tires are successively vulcanized to produce a predetermined number of PSR tires of type A as a lot.

In the above-mentioned tire production line, the changeover between different types A and B of tires to be produced is carried out in the following manner. It is assumed that the production of tires of the type A as a lot has been completed. The components of the green tire building station, which are different between the tire types A and B, as well as unvulcanized tire component members are exchanged, while twelve vulcanizing molds for type A are successively removed from the vulcanizing unit and twelve vulcanizing molds for type B are successively mounted on the vulcanizing unit, so that the exchange operations at the green tire building station and the vulcanization station are substantially simultaneously completed. Then, the formation of green tires GT of the type B and the vulcanization of the green tire are started.

In order that the above-mentioned exchange operations at the green tire building station and the vulcanization station can be completed substantially simultaneously, it is necessary to shorten the time required for mounting the molds onto, and detaching the molds from the vulcanizing units has to be shortened. To this end, it is highly desirable that external arrangements performed with respect to the molds outside the vulcanizing units are increased as much as possible, so as to minimize internal arrangements to be performed at the vulcanizing units themselves.

For example, there is required a series of operational steps at the vulcanization station, which have been conventionally performed as internal arrangements. Among others, such operational steps include detaching the bladders from the molds, mounting the associated ring members, such as bead rings, bladder rings and the like to the molds, assembling the bladders, exchanging the display panel for marking production information onto product tires, etc. As subsequent operational steps, the accessory rings and the panel display are checked as external arrangements, and the molds are then preheated to a predetermined temperature close to the vulcanizing temperature, which preheating has been conventionally carried out as internal arrangements, too.

According to the present invention, all of the above-mentioned operational steps can be carried out as external arrangements with respect to the molds which can be directly mounted to the vulcanizing units and immediately used for vulcanization essentially without loss time or waiting time. Preferred embodiments of the present invention as related to the vulcanizing mold, which are highly suitable for the above-mentioned outside arrangements, will be more fully described hereinafter. The increased operational steps carried out as outside arrangements in accordance with the present invention serve significantly to reduce the inside arrangements, so that the time required to perform changeover at the green tire building station can be matched with the time required to perform changeover at the vulcanization station, thereby substantially eliminating the waiting time and the green tire stock time.

The above-mentioned production line according to the present invention makes it possible to substantially eliminate the green tire stock time while minimizing the frequency of changeover of the tire types at the green tire building station. The requirement for an increased number of vulcanizing molds can be fully compensated by the minimized stock time or amount of the green tires, which allows a downsizing of the green tire storage facility and a significant space savings at the tire factory and also contributes to the maintenance of the desired high quality of the green tires.

Furthermore, in the case of conventional approach in which the green tire stock time is reduced to be within one hour, with two vulcanizing molds arranged for each vulcanizing unit as in Case 3 in FIG. 1, it wold be necessary to perform changeover of the tire types as many as sixty times per day, thereby giving rise to various problems due to requirement for various kinds of intermediate stocks to be retained prior to the building of the green tires, such as space loss, transfer loss, changeover loss, managing loss, etc., of the intermediate stocks. The tire production system according to the present invention is not only essentially free from these problems, but also allows automated preparation and transfer of the intermediate stocks.

There is shown in FIG. 1, with reference to Case 1, a situation in which twelve segmented molds are all assigned to a vulcanizing unit and used to produce tires of a single type. There is also shown in FIG. 1, with reference to Case 2, an advanced situation in which twelve segmented molds are suitably assigned to the vulcanizing unit so as to produce tires of different types A and B. The optimum assignment can be determined by calculation taking into account one or more factors, such as lot production lot ratio of tire types A and B, time ratio between building and vulcanization of a green tire, mold changeover time, cost of a mold, etc. Thus, there may be instances wherein six molds are used to produce tires of type A and remaining six molds are used to produce tires of type B, or wherein eight molds are used to produce tires of type A and remaining four molds are used to produce tires of type B. It can be appreciated from FIG. 1 that when, for example, six molds are respectively used to produce tires of types A and B, in order to reduce the green tire stock time to approximately one hour, the changeover between types of tires at the green tire building station is performed twelve times per day, though changeover of the molds at the vulcanization station is not required. This means that the frequency of changeover between tire types is reduced in the situation of Case 2 to one fifth (⅕) as compared to the situation of Case 3.

In the situation of Case 2, the building station is supplied by servicers with component members for tires of two types A, B and green tires for the two types are alternately formed (A→B→A→B→A), whereas a group of twelve vulcanizing molds at the vulcanization station perform vulcanization of the green tires to produce tires of the two types A, B in parallel with each other, with six molds assigned to each of the types A and B.

When one of the two types A, B, for example, the type A is changed-over to another type C which is different from the type A, six molds for the type A at the vulcanization station are collectively changed-over to the molds for type C. At the same time, changeover is performed at the building station to shift formation of green tires from the type A to the type C, in line with the changeover at the vulcanization station. After the changeovers at the two stations have been completed, green tires for two types B, C are alternately formed at the building station (B→C→B→C→B), whereas a group of twelve vulcanizing molds at the vulcanization station perform vulcanization of the green tires to produce tires of the two types B, C in parallel with each other, with six molds assigned to each of the types B, C.

It is assumed that the types of green tires to be formed at the building station is limited to two types A, B, and the green tires of these two types A, B are alternately formed. In this instance, formation of green tires for the two types A, B is carried out by alternately moving servicers for the two types A, B and supplying unvulcanized component members for each type of green tires to a predetermined location of a building drum at the building station. The setting of the servicers for supplying unvulcanized components members to the building drum can be carried out as an outside arrangement. Such an outside arrangement makes it possible to significantly reduce the time required for the inside arrangement at the vulcanizing units, as compared with the situation in which changeover is performed so that green tires of three or more types A, B, C, . . . N are successively formed like A→B→C→ . . . N→A→B→C→ . . . N.

When one of the two types A, B is changed-over, e.g., from the type A to the type C, the servicers for the two types A, B are moved immediately after completion of formation of green tires for the type A at the building station, such that the servicer for the type A is removed from a predetermined position of the building drum at the building station and changed with the servicer for the type C as an outside arrangement, while the servicer for the type B is set to the predetermined position of the building drum. After a green tire for the type B has been formed, the servicers for the two types A, C are moved in opposite sense such that the servicer for the type C is set to the predetermined position of the building drum to begin formation of a green tire for the type C. This explanation is applicable also to a situation in which formation of green tires for the type A is continued while formation of green tires for the type B is changed-over to that for the type C.

The period of alternate formation of green tires for the two types at the building station can be relatively freely adjusted, i.e., prolonged or shortened substantially as desired. By an appropriate adjustment of the alternate formation period for building the two types of green tires at the building station, it is possible to minimize the green tire stock time while reducing the waiting time at the vulcanizing units to substantially zero. Also, the alternate formation of two types of green tires according to the present invention serves significantly to reduce the stock amount of the unvulcanized components members around the building station, and to reduce the frequency of changeover in preparation of the component members prior to formation of green tires, as compared with the conventional approach in which changeover is carried out among three or more types.

The above-mentioned process for highly efficiently producing pneumatic tires can be suitably carried out by a system, some embodiments of which will be explained below with reference to block diagrams shown in FIGS. 2 and 3.

Figure 2:
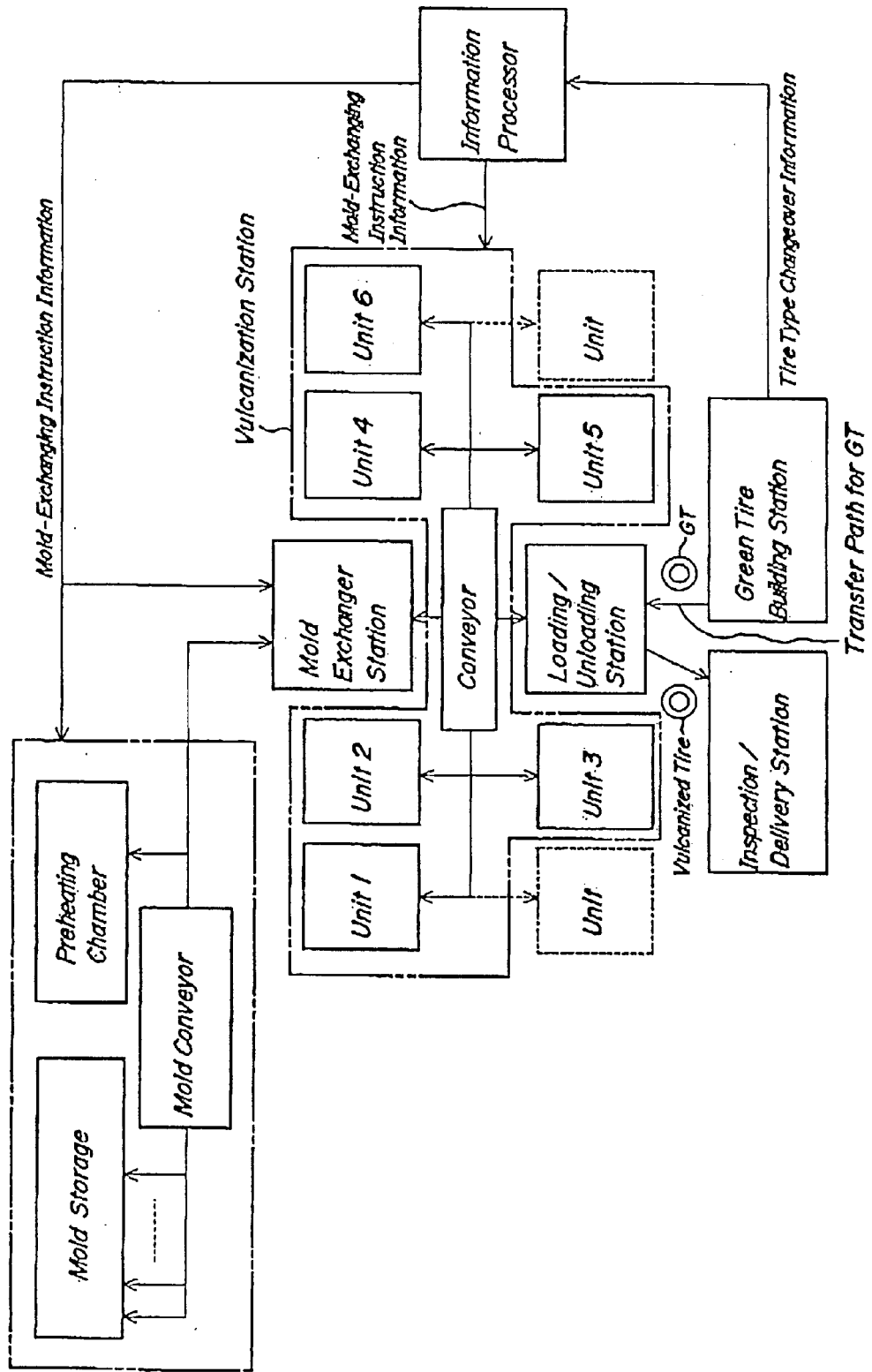
FIG. 2 is a block diagram showing the production system according to one embodiment of the present invention.
Figure 3:
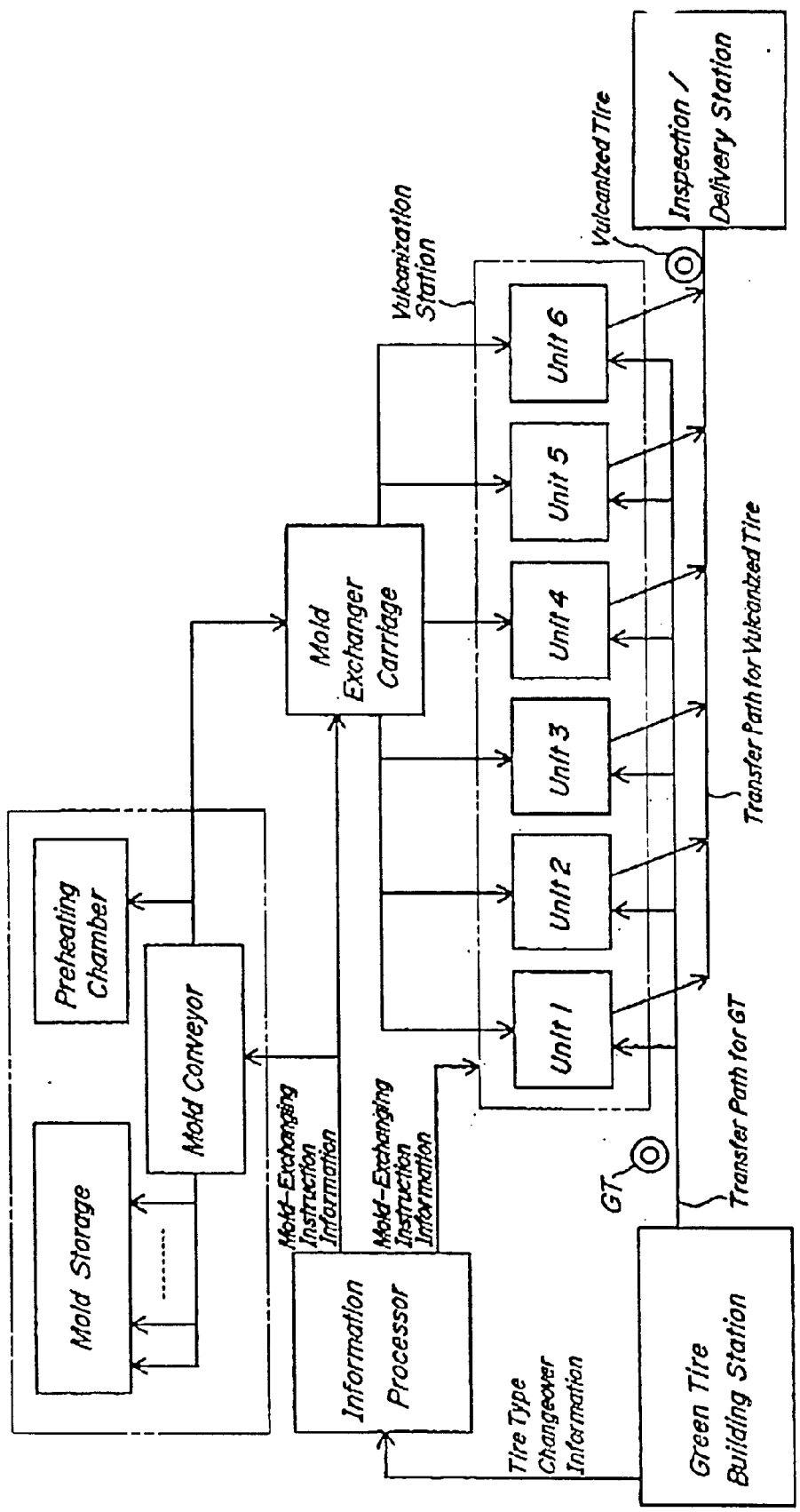
FIG. 3 is a block diagram showing the production system according to another embodiment of the present invention.

In the embodiment of the tire production system according to the present invention as shown in FIGS. 2 and 3, the building station includes green tire building drums, servicers for unvulcanized tire component members, etc., so that all the green tire building works can be carried out in the building station. A plurality of vulcanizing units 1 to 6 each equipped with vulcanizing molds are included in a vulcanization station. The vulcanization station is paired with the green tire building station, and associated with a gas supply station in which high temperature, high pressure gas is supplied to the moving type vulcanizing units 1 to 6 to carry out vulcanization of green tires.

In the vulcanization station shown in FIG. 2, the vulcanization station further includes a conveyor which is associated the vulcanizing units 1 to 6. The conveyor serves to convey vulcanizing molds between the vulcanizing units 1 to 6 and the mold exchanger station, unvulcanized green tires from the loading/unloading station to the vulcanizing units 1 to 6, and vulcanized tires from the vulcanizing units 1 to 6 to the loading/unloading station. The embodiments of FIG. 2 may be modified so that the vulcanizing units 1 to 6 are movable along a transfer path which includes the mold exchanger station for the vulcanizing molds, the loading/unloading station for green tires and vulcanized tires, and the gas supply station for the high temperature, high pressure gas to be supplied to the movable vulcanizing units 1 to 6. In this instance, the transfer path for the vulcanizing units 1 to 6 may a crank-shaped track, an arcuate track or an oval track. Furthermore, in the embodiment of FIG. 3, the vulcanizing units 1 to 6 at the vulcanization station are stationary units each associated with a mold exchanger carriage and the gas supply station as mentioned above.

A green tire conveyor arranged between the building station and the vulcanizing unit may be associated with a selector device for discriminating and selecting the types of the green tires GT. In this instance, the green tires GT selected by the selector device are conveyed to the loading/unloading station as shown in FIG. 2, or to the relevant vulcanizing unit as shown in FIG. 3. Then, the green tire GT is loaded onto the empty mold of the vulcanizing unit from which the vulcanized tire has been unloaded. The types of the green tire can be discriminated by the selector device, by reading out relevant information stored in appropriate information carrier which has been previously applied to each green tire GT. There is essentially no difference in the processing time between the building station and the vulcanizing station paired thereto. Thus, the green tires to be vulcanized can be loaded to the relevant vulcanizing units essentially without loss time, with a minimized waiting time, if any.

In the vulcanization station shown in FIG. 2, the vulcanizing unit in which a green tire has been vulcanized may be moved to the loading/unloading station by appropriate driving device, where a vulcanized tire is unloaded from the vulcanizing mold by an unloading device and an unvulcanized green tire is loaded to the vulcanizing mold by a loading device.

The vulcanizing unit with respect to which unloading of the vulcanized tire and the loading of a green tire have been completed is returned to the initial position by the driving device. In this instance, the unloading device and the loading device may be arranged in a combined form, or independently from each other. When, for example, the green tires experience a slight waiting time for the loading operation onto the vulcanizing molds, the independent arrangement of the loading and unloading devices may be preferred. After a green tire has been loaded onto the vulcanizing mold, the mold is closed and the supply of the high temperature, high pressure gas is started either at the loading/unloading station or after the vulcanizing unit has returned to the predetermined position. The timing for starting supply of the high temperature, high pressure gas to the vulcanizing mold may be determined as appropriate, depending upon the circumstances. On the other hand, the vulcanized tire unloaded from the mold at the loading/unloading station is transferred to an inspection/delivery station.

The vulcanization station shown in FIG. 3 is associated with unloading devices for vulcanized tires and loading devices for green tires, which are provided for the respective vulcanizing units 1 to 6 so that a vulcanized tire is unloaded from the vulcanizing mold by the unloading device and an unvulcanized green tire is loaded to the vulcanizing mold by the loading device. The vulcanized tire unloaded from the mold is transferred to an inspection/delivery station along a transfer path, while a green tire is engaged by the loading device and loaded to the empty mold from which unloading of the vulcanized tire has just been completed. The vulcanizing mold is then closed so that supply of high temperature, high pressure gas is started to perform vulcanization of the green tire. In this instance also, when the green tires experience a slight waiting time for the loading operation onto the vulcanizing molds, the unloading device and the loading device may be arranged independently from each. Alternatively, when there is essentially waiting time for loading the green tires onto the vulcanizing molds, the unloading device and the loading device may be combined with each other.

As shown in the upper left corner of FIGS. 2 and 3, the tire production system according to the present invention includes a mold storage for storing vulcanizing molds, a preheating chamber for the molds immediately before they are loaded onto each vulcanizing unit, and a conveyor for the transfer of the molds along path which extends between the mold storage and the preheating chamber. The conveyor is also movable along a path which extends between the preheating chamber and the mold exchanger station (FIG. 2), or a path which extends between the preheating chamber and the mold exchanger carrier (FIG. 3).

It is highly advantageous, from the space-saving consideration, that the mold storage is at least partly in the form of a storage space in which the molds are stored as vertical arrays. The storage space may be provided therein with the preheating chamber as an associated facility. It is preferred that the molds in the storage and the preheating chamber are transferred by at least one conveyor which may be in the form of stacker cranes movable along rails or on the floor. Also, the molds stored in the storage space in the vicinity of the floor may be transferred between the preheating chamber and the mold exchanger station (FIG. 2) or between the preheating chamber and the mold exchanger carriage by another conveyor, for example, an ordinary crane. The mold storage space, the preheating chamber and the conveyor may be combined as an integrated vulcanization preparation station.

According to a preferred embodiment of the present invention, an information processor is disposed between the green tire building station and the vulcanizing station. Thus, when a changeover is performed between the types of tires to be produced, the information processor receives a signal transmitted from the green tire building station, indicating that the type of the tire to be produced has been changed. The information processor then generates an instruction signal indicating that a predetermined number of the vulcanizing molds have to be exchanged, and transmits this instruction signal to the vulcanization preparation station first of all, and then to the vulcanizing station and also to the mold exchanger station (FIG. 2) or the mold exchanger carriage (FIG. 3).

The vulcanization preparation station, which is the first to receive the mold exchanging instruction signal from the information processor, transfers the necessary molds to the preheating chamber by the conveyor device such as a stacker crane. The molds are then preheated over a predetermined time, and then transferred to the mold exchanger station or to the mold exchanger carriage by a conveyor device such as a crane and suspension fitting, at the instance of actual exchange of the molds. Before the molds are transferred to the mold exchanger station or to the mold exchanger carriage, when the mold changeover instruction signal from the information processor is received by the vulcanization station, the operation of the vulcanizing units with respect to which the molds have to be exchanged is stopped as soon as the vulcanization of the tire has been completed.

In the embodiment of the present invention shown in FIG. 2, when the mold exchange instruction signal from the information processor is received, the vulcanizing unit out of operation is moved to the mold exchanger station where the mold which had been used with respect to the previous type is changed with the preheated mold for the new type. The vulcanizing unit for which the exchange of the mold has been completed is returned to the initial position. At the same time, the mold used for vulcanization of the green tire of the previous type is automatically returned to the predetermined location at the mold storage space. The exchange of the mold is carried out synchronously with the changeover of the tire type at the green tire building station.

In the embodiment of the present invention shown in FIG. 3, when the mold exchange instruction signal from the information processor is received, the mold exchanger carriage is moved to the location of the vulcanizing unit which is out of operation. The mold which had been used with respect to the previous type is changed with the preheated mold for the new type. Then, the signal processor transmits an operation instruction signal to the vulcanizing unit for which exchange of the mold has been completed. At the same time, the mold used for vulcanization of the green tire of the previous type is automatically returned to the predetermined location at the mold storage space. The exchange of the mold is carried out synchronously with the changeover of the tire type at the green tire building station.

The above-mentioned vulcanizing unit may be equipped with conventional two-piece vulcanizing mold; however, an optimum vulcanizing mold which can be suitably applied to the production system according to the present invention is a segmented mold which requires a significant time for the inside arrangements a number of which can be converted into outside arrangements. One example of the segmented molds of this kind will be briefly described below.

Figure 4:
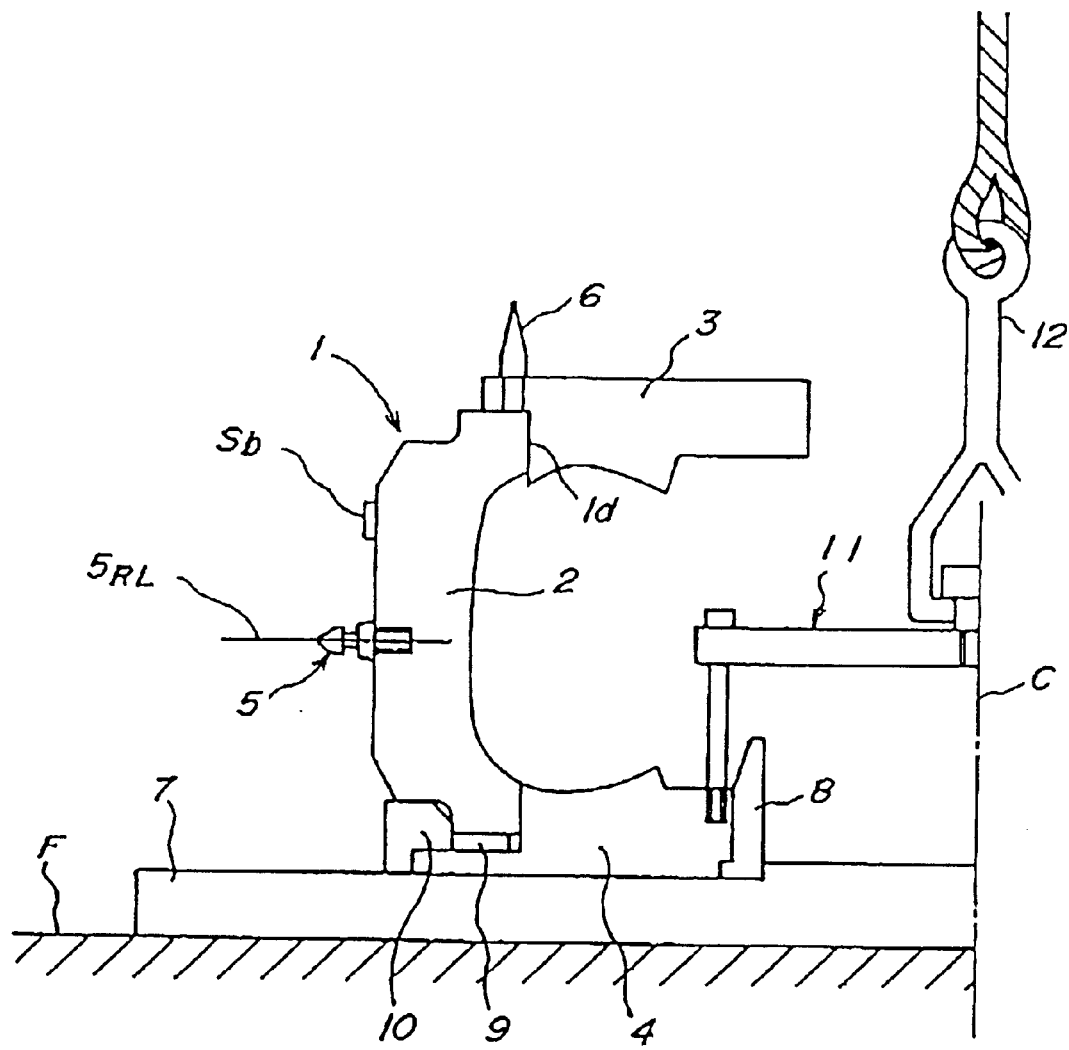
FIG. 4 is a left-half sectional view of a mold main body of segmented molds according to the invention.

As shown in FIG. 4, a segmented mold which may be suitably applied to the present invention comprises a mold main body 1 including a plurality of tread mold pieces 2 for forming an outer contour of a tire tread portion. The mold main body 1 further includes an upper side mold 3 and a lower side mold 4, each having a hollow disc-like shape and being engaged with the tread mold pieces 2 so as to form the outer contour at the side wall portions of the tire. The tread mold piece 2 has an outer periphery which is provided with lock pins 5 on both sides thereof, as seen in the circumferential direction. The lock pin 5 has a neck portion located adjacent to the tread mold piece 2, and a tapered guide portion which extends from a collar-like edge at the terminal end of the neck portion in the radial direction. The upper side mold 3 is fixedly provided with a plurality of guide pins 6 for guiding the top plate.

The mold main body 1 is assembled around a centering ring 8 which is fitted into a platform 7 on a floor F or an installation surface of the mold main body 1, with the height of the tread mold piece 2 adjusted by a spacer ring 9. The tread mold pieces 2 are then stabilized and retained in place by a holder device 10. All of the component members of the mold main body 1 are united together by a tightening band Sb, symmetrically with respect to a center line C. The storage, preheating, transfer, loading and unloading of the segmented mold are performed in such an assembled state of the mold main body 1. The transfer of the mold is carried out using, for example, a crane (not shown) and suspension fittings 11, 12.

FIG. 5 is a left-half sectional view of the segmented mold of which the mold main body 1 is associated with a container. The container comprises a plurality of segments 20 for holding the tread mold pieces 2 from outside and moving radially outwards. A container ring 21 is engaged with the segments 20 so that the vertical sliding movement of the container ring 21 causes the segments 20 to move radially outward or inwards. A top plate 22 serves to securely hold the upper side mold 3 and to move the same upwards from the mold main body 1 when the vulcanizing unit is opened. FIG. 5 shows a state in which the container ring 21 is has been moved upwards so that the segments 20 are moved radially outwards from the tread mold pieces 2 of the mold main body 1.

Each segment 20 is formed with through-holes 23 for receiving the lock pins 5 of the tread mold piece 2 with a predetermined play, and provided with vertically movable plates 25 each having an engaging arm 24 which can be locked with the lock pin 25. The plates 25 are slidably attached to both sides of the segment 20, such that the engaging arm 24 can be moved vertically across the through hole 23, in a space in the segments. Each segment 20 is radially slidable along a radial groove which is formed by a plate ring 26 and a sliding plate 27.

FIG. 6 shows a state in which the container ring 21 has been moved vertically downwards, thereby causing the segments 20 to move radially inwards such that the segments 20 are locked with the respective tread mold pieces 2. The vulcanization of green tire is performed, with bladders and bladder rings (not shown) combined with the mold main body 1.

As shown in FIG. 6, the lock pin 5 at each tread mold piece 2 is passed below the lower surface of the engaging arm 24, and the engaging arm 24 is then released or dropped and thereby engaged with the neck portion of the lock pin 5. By this, the lock pin 5 is automatically locked with the engaging arm 24 and the tread mold piece 2 is automatically connected to the segment 20. The lower surface of the engaging arm 24 before the locking operation is situated at least slightly above the center axis line 5RL of the lock pin 5 and the center axis line 23RL of the penetrating hole 23 which are coaxial with each other. The top plate 22 is fixed to the upper side mold 3 in a facilitated manner and within a minimized time, by being guided by the guide pins 6 at the upper side mold 3 and fixedly connected by bolts 28.

With further reference to FIG. 6, the entire mold main body 1 is lifted from the platform 7, and a protruding member (not shown) with an upper surface corresponding in dimension to the lower surface of the vertically movable plate 25 is arranged on the platform 7 opposite to each other. The mold main body 1 is then lowered and returned onto the platform 7 so that the protruding member causes the vertically movable plate 25 to move upwards. By this, the engaging arm 24 is moved upwards and disengaged from the lock pin 25, thereby causing the locking to be automatically released. Subsequently, as shown in FIG. 5, by moving the container ring 21 upwards, the segments 20 can be moved radially outwards and thereby separated from the mold main body 1. Thus, the mold main body 1 can be separated from the container in a facilitated manner and within a minimized time.

In the segmented mold constructed as described above, upon changeover of types of tires to be produced, the mold main body 1 can be easily separated from the container and conveyed to the mold storage space, by performing disassembly of the components in the sequence as shown in FIGS. 6, 5 and 4. Also, another mold main body 1 for a different type of tires can be easily loaded to the vulcanizing unit, by performing assembly of the components in essentially opposite sequence as shown in FIGS. 4, 5 and 6. In this way, the changeover of the mold main body 1 at the vulcanizing unit can be performed in a facilitated manner and within a minimized time, while achieving an automatic association of the mold main body with the container. This means that the many process steps performed with respect to the vulcanizing molds conventionally as inside arrangements can be converted into the outside arrangements, to significantly reduce the time required for the inside arrangements.

According to the above-mentioned exchanging process for the vulcanizing molds, it is only the mold main body 1 which has to be transferred to the mold exchanger station or mold exchanger carriage upon changeover of the vulcanizing mold for producing different type of tires, thereby mitigating troublesome transfer and shortening the preheating time. While such advantage can be achieved only to the extent that container can be commonly used for different types of mold main bodies, an appropriate production plan can be designed in many instances so as to allow the container to be commonly used for various types of vulcanization molds.

It can be appreciated from the foregoing detailed description that the present invention provides an improved production system for pneumatic tires in which the changeover in types of tires at the green tire building station can be minimized, and the kinds and amount of the intermediate stock materials before vulcanization of the green tires can be reduced. It is thus possible to realize a significant space-saving in the tire factory and more simply and easily achieve an automation production, while essentially eliminating the requirement for the stock of the green tires. The pneumatic tire production system according to the present invention is further advantageous in terms of improved manufacturing productivity in a tire factory as a whole, reduction of the production cost, stabilization and improvement in the product quality, simplification of the management, reduction of the capital investment, and increase in the production amount due to the space-saving.

It is to be noted that the above-mentioned embodiments were presented solely by way of examples only, and various modifications and/or alterations are possible within the scope of the invention as defined by the appended claims.

What is claimed is:

1. A method for producing pneumatic tires, comprising a green tire building step for assembling unvulcanized members of a radial tire into a green tire, said green tire building step being performed in a building cycle time, and a vulcanization step for carrying out vulcanization of the green tire, said vulcanization step being performed in a vulcanizing cycle time which is longer than said building cycle time, wherein pneumatic tires are produced by at least one production line which comprises a green tire building station including at least one set of building drums, and a vulcanization station including at least one vulcanizing unit equipped with a plurality of vulcanizing molds of a number which satisfies a vulcanizing capacity substantially equivalent to the number of green tires formed at said building station within a predetermined unit time;

building green tires of a set of first and second types at said building station, and synchronously performing simultaneous vulcanization of the green tires of the set of first and second types at the vulcanizing station;

changing-over production of pneumatic tires from the set of first and second types to a set of first and third types, by exchanging predetermined vulcanizing molds at the vulcanization station, the number of predetermined vulcanizing molds corresponding to said building cycle time inclusive of a building-suspension time required to change the vulcanizing molds of the second type into vulcanizing molds of the third type; and performing, on the molds to be exchanged into the production line to cure the new tire type, a series of required operational steps as external or outside operational arrangement steps with respect to the molds mounted to the at least one vulcanizing unit at the vulcanization station, the external or outside operational arrangement steps including one or more steps of detaching bladders from the molds, mounting associated ring members to the molds, assembling bladders and exchanging a display panel for marking production information onto product tires, and wherein the external or outside operational arrangement steps are performed outside the vulcanizing station.

2. A method for producing pneumatic tires according to claim 1, comprising the steps of:

alternately building, synchronously with the exchange of the vulcanizing molds, green tires of the set of first and third types at the building station, and synchronously performing simultaneous vulcanization of the green tires of the set of first and third types at the vulcanizing station.

3. A method for producing pneumatic tires according to claim 1, wherein said production line comprises exchanger means for exchanging said vulcanization molds, said exchanger means being associated with said vulcanizing unit, and an information processor for receiving information from said green tire building station indicating a changeover of the type of pneumatic tires to be produced, and providing an output information to said exchanger means indicating that the vulcanizing molds of the vulcanizing station are to be partly exchanged, whereby a partial exchange of the vulcanizing molds by the exchanger means is performed synchronously with the changeover of the type of pneumatic tires at the green tire building station.

4. A method for producing pneumatic tires according to claim 1, wherein said vulcanizing molds are segmented molds each including a plurality of segmented tread mold pieces for forming an outer contour of a tire tread portion, a plurality of segments arranged on an outer peripheral side of the respective tread mold pieces, for radially moving the respective tread mold pieces, and means for automatically locking and releasing said segments to and from the respective tread mold pieces.

5. A method for producing pneumatic tires according to claim 4, wherein each of said vulcanizing units includes a container ring connected to said segments of the such that a vertical movement of the container ring causes a radial movement of the segments, an upper and a lower side molds which are engageable with the tread mold pieces, and a top plate for urging the upper side mold into engagement with the tread mold pieces, and wherein the vulcanizing molds at the vulcanizing unit are partially exchanged while the vulcanizing unit is out of operation, by (i) releasing said segments from the respective tread mold pieces and moving the container ring upward so that the segments are moved radially outwards, while the upper side mold in engagement with the tread mold pieces is separated from the top plate, and unloading the tread mold pieces and the upper and lower side molds connected therewith, and (ii) loading a plurality of segmented tread mold pieces and upper and lower side molds forming another segmented mold for a pneumatic tire of a different type, in their preliminary connected and centered state, and moving the container ring downwards, so that said segments are moved inwards and locked with the segmented tread mold pieces while urging the top plate to the upper side mold.

* * * * *